(12) United States Patent
Chen et al.

(10) Patent No.: US 9,948,191 B2
(45) Date of Patent: Apr. 17, 2018

(54) CONSTANT VOLTAGE OUTPUT CIRCUIT, FLYBACK SWITCHING POWER SUPPLY AND ELECTRONIC DEVICE

(71) Applicant: Shenzhen Skyworth-RGB Electronic Co., Ltd., Shenzhen (CN)

(72) Inventors: Jianzhong Chen, Shenzhen (CN); Jitao Yang, Shenzhen (CN)

(73) Assignee: TCL Technoly Electronics (Huizhou) Co., Ltd, Huizhou (CN)

( * ) Notice: Subject to any disclaimer, the term of this patent is extended or adjusted under 35 U.S.C. 154(b) by 0 days.

(21) Appl. No.: 15/494,818

(22) Filed: Apr. 24, 2017

(65) Prior Publication Data

US 2017/0229969 A1    Aug. 10, 2017

Related U.S. Application Data

(63) Continuation of application No. PCT/CN2016/086524, filed on Jun. 21, 2016.

(30) Foreign Application Priority Data

Nov. 30, 2015    (CN) .......................... 2015 1 0863886

(51) Int. Cl.
*H02M 3/335*    (2006.01)
*H02M 1/44*    (2007.01)
(Continued)

(52) U.S. Cl.
CPC ......... *H02M 3/33507* (2013.01); *H02M 1/32* (2013.01); *H02M 1/36* (2013.01); *H02M 1/44* (2013.01)

(58) Field of Classification Search
CPC ............... H02M 1/08; H02M 3/33507; H02M 3/33515; H02M 3/33546
(Continued)

(56) References Cited

U.S. PATENT DOCUMENTS 6,038,143 A * 3/2000 Miyazaki ............ H02M 3/3385
363/19
6,172,492 B1 * 1/2001 Pletcher .............. H02M 1/4258
323/284
(Continued)

FOREIGN PATENT DOCUMENTS

CN    101753026 A    6/2010
CN    102255507 A    11/2011
CN    105375777 A    3/2016

OTHER PUBLICATIONS

"Modulated Constant Off-Time Control Mechanism" Jul. 1998, LinFinity Note AN-9.*
(Continued)

*Primary Examiner* — Jeffrey Sterrett
(74) *Attorney, Agent, or Firm* — Wayne & King LLC (57) ABSTRACT

A constant output circuit is disclosed that includes a power supply circuit, a LM-FOT control circuit, a switching circuit and a transformer. Output ends of the power supply circuit are respectively connected with a first input end of the LM-FOT control circuit and an end of a primary winding of the transformer. A controlling end of the LM-FOT control circuit is connected with a controlled end of the switching circuit. A second input end of the LM-FOT control circuit is connected with an output end of the switching circuit. An input end of the switching circuit is connected with the other end of the primary winding of the transformer. An end of a secondary line winding of the transformer is configured for outputting constant voltage signals. Another end of the secondary line winding of the transformer is grounded.

17 Claims, 6 Drawing Sheets

(51) Int. Cl.
*H02M 1/32* (2007.01)
*H02M 1/36* (2007.01)

(58) Field of Classification Search
USPC ......... 363/21.04, 21.05, 21.11, 21.12, 21.13, 363/21.18, 97
See application file for complete search history.

(56) References Cited

U.S. PATENT DOCUMENTS

| | | | |
|---|---|---|---|
| 6,944,034 B1* | 9/2005 | Shteynberg | H02M 1/4258 323/282 |
| 7,911,812 B2* | 3/2011 | Colbeck | H02M 1/4225 363/21.02 |
| 2005/0007084 A1 | 1/2005 | Grose et al. | |
| 2013/0027990 A1* | 1/2013 | Baurle et al. | H02M 3/33507 363/21.17 |
| 2017/0229969 A1* | 8/2017 | Chen | H02M 3/33507 |
| 2017/0231041 A1* | 8/2017 | Yang | H05B 33/0815 |
| 2017/0310923 A1* | 10/2017 | Yang | H04N 5/63 |

OTHER PUBLICATIONS

"Solution for designing a fixed off-timecontrolled PFC pre-regulator with the L6564" Feb. 2011, ST application note AN3112, pp. 1-36.*
Adragna et al, "New Fixed Off-Time PWM Modulator Provides Constant Frequency Operation in Boost PFC Pre-Regulators", Jun. 2008, 2008IEEE, pp. 656-661.*
Haghi et al, "Design of a Bridgeless PFC with Line-Modulated Fixed Off-Time Current Control and Zero-Voltage Switching", Jun. 2010, 2010IEEE, pp. 129-134.*

* cited by examiner

CONSTANT VOLTAGE OUTPUT CIRCUIT, FLYBACK SWITCHING POWER SUPPLY AND ELECTRONIC DEVICE

CROSS-REFERENCE TO RELATED APPLICATIONS

This application is a continuation of International Patent Application No. PCT/CN2016/086524 with a filing date of Jun. 21, 2016, designating the United States, now pending, and further claims priority to Chinese Patent Application No. 201510863886.7 with a filing date of Nov. 30, 2015, designating the United States, now pending. The content of the aforementioned applications, including any intervening amendments thereto, are incorporated herein by reference.

TECHNICAL FIELD

The present invention relates to field of an electronic circuit, and more particularly, to a constant voltage output circuit, a flyback switching power supply and an electronic device.

BACKGROUND OF THE PRESENT INVENTION

Currently, most flyback switching power supplies uses a PWM control work mode to realize outputting constant voltage. Due to existing PWM control is controlling the peak current with a fixed frequency, when the duty ratio is more than 50%, the input voltage and loading condition are fixed, although inductance peak detection current is constant, but the inductance current appears a disturbance $\Delta I_0$, resulting in a bigger disturbance $\Delta I_1$ in the next period, then a current oscillation is formed to cause unstable output voltages. Therefore, manufacturing the flyback switching power supply needs the high voltage electrolytic capacitor to filter the rectified voltage, to make the output voltage of the flyback switching power supply stable.

The high voltage electrolytic capacitor enables the current to deliver leading current, and prevents the current and the voltage from homo-phase supply power, wasting the electricity.

SUMMARY OF PRESENT INVENTION

The present invention aims to provide a constant voltage output circuit, a flyback switching power supply and an electronic device. To realize the function of the constant voltage circuit being able to output constant voltage signals without the high voltage electrolytic capacitor.

To make the above aims come true, the present invention provides the constant voltage output circuit which includes: a power supply circuit; a Line-modulated Fixed-Off-Time control circuit, abbreviation for a LM-FOT control circuit; a switching circuit and a transformer.

Output ends of the power supply circuit are respectively connected with a first input end of the LM-FOT control circuit and an end of a primary winding of the transformer. A controlling end of the LM-FOT control circuit is connected with a controlled end of the switching circuit. A second input end of the LM-FOT control circuit is connected with an output end of the switching circuit. An input end of the switching circuit is connected with the other end of the primary winding of the transformer. An end of a secondary line winding of the transformer is configured as an output end of the constant voltage output circuit, another end of the secondary line winding of the transformer is grounded. The LM-FOT control circuit is configured for controlling a fixed-off time of the switching circuit based on voltage signals outputted by the power supply circuit, enabling the entire constant voltage output circuit to output constant voltage signals.

Preferably, the constant output circuit further includes a sampling circuit. A signal collecting end of the sampling circuit is connected to the output end of the power supply circuit. A signal collecting output end of the sampling circuit is connected with the first input end of the LM-FOT control circuit.

Preferably, the constant voltage output circuit further includes a constant voltage feedback circuit. An input end of the constant voltage feedback circuit is connected with the output end of the constant voltage output circuit. An output end of the constant voltage feedback circuit is connected with a feedback end of the LM-FOT control circuit.

Preferably, the constant output circuit further includes a voltage stabilizing circuit. An end of the voltage stabilizing circuit is connected with an end of the secondary line winding of the transformer, another end of the voltage stabilizing circuit is configured as an output end of the constant voltage output circuit.

Preferably, the switching circuit includes a first enhanced NMOS tube and a first resistance. A drain of the first enhanced NMOS tube is the input end of the switching circuit. A grid of the first enhanced NMOS tube is a controlled end of the switching circuit. A source of the first enhanced NMOS tube is connected with an end of the first resistance. A node connecting the first enhanced NMOS tube and the first resistance is the output end of the switching circuit. Another end of the first resistance is grounded.

Preferably, the LM-FOT control circuit includes a multiplier, a LM-FOT modulator, a trigger, a driver, a first comparator and a first capacitance. An input end of the multiplier is the first input end of the LM-FOT control circuit. A first output end of the multiplier is connected with an anti-phase input end of the first comparator. The node connecting the multiplier and the first comparator is configured for inputting a first reference voltage. A second output end of the multiplier is connected with a second signal port of the LM-FOT modulator.

A homo-phase input end of the first comparator is the second input end of the LM-FOT control circuit. An output end of the first comparator is respectively connected with a fourth signal port of the LM-FOT modulator and a second signal port of the trigger; a first signal port of the LM-FOT modulator is connected with an end of the first capacitance, another end of the first capacitance is grounded; a third signal port of the LM-FOT modulator is connected with a first signal port of the trigger. An output end of the trigger is connected with an end of the driver. Another end of the driver is the controlling end of the LM-FOT control circuit.

Preferably, the LM-FOT control circuit further includes a second comparator. An anti-phase input end of the second comparator is configured for inputting a second reference voltage. A homo-phase input end of the second comparator is connected with the homo-phase input end of the first comparator. An output end of the second comparator is connected with a fifth signal port of the LM-FOT modulator.

Preferably, the LM-FOT control circuit further includes a third comparator. A homo-phase input end of the third comparator is configured for inputting a third reference voltage. An anti-phase input end of the third comparator is a feedback end of the LM-FOT control circuit. An output end of the third comparator is connected with a second input end of the multiplier.

Furthermore, in order to reach the above aim, the present invention provides a flyback switching power supply that includes the above constant voltage output circuit. The constant voltage output circuit includes a power supply circuit, a Line-modulated Fixed-Off-Time control circuit, abbreviation for a LM-FOT control circuit, a switching circuit and a transformer.

Output ends of the power supply circuit are respectively connected with a first input end of the LM-FOT control circuit and an end of a primary winding of the transformer. A controlling end of the LM-FOT control circuit is connected with a controlled end of the switching circuit. A second input end of the LM-FOT control circuit is connected with an output end of the switching circuit. An input end of the switching circuit is connected with the other end of the primary winding of the transformer. An end of a secondary line winding of the transformer is configured as an output end of the constant voltage output circuit, another end of the secondary line winding of the transformer is grounded. The LM-FOT control circuit is configured for controlling a fixed turn-off time of the switching circuit based on voltage signals outputted by the power supply circuit, enabling the entire constant voltage output circuit to output constant voltage signals.

Preferably, the constant voltage output circuit further includes a sampling circuit. A signal collecting end of the sampling circuit is connected to the output end of the power supply circuit. A signal collecting output end of the sampling circuit is connected with the first input end of the LM-FOT control circuit.

Preferably, the constant voltage output circuit further includes a constant voltage feedback circuit. An input end of the constant voltage feedback circuit is connected with the output end of the constant voltage output circuit. An output end of the constant voltage output circuit is connected with a feedback end of the LM-FOT control circuit.

Preferably, the constant voltage output circuit further includes a voltage stabilizing circuit. An end of the voltage stabilizing circuit is connected with an end of the secondary line winding of the transformer, another end of the voltage stabilizing circuit is configured as an output end of the constant voltage output circuit.

Preferably, the switching circuit includes a first enhanced NMOS tube and a first resistance. A drain of the first enhanced NMOS tube is the input end of the switching circuit. A grid of the first enhanced NMOS tube is a controlled end of the switching circuit. A source of the first enhanced NMOS tube is connected with an end of the first resistance. A node connecting the first enhanced NMOS tube and the first resistance is the output end of the switching circuit. Another end of the first resistance is grounded.

Preferably, the LM-FOT control circuit includes a multiplier, a LM-FOT modulator, a trigger, a driver, a first comparator and a first capacitance. An input end of the multiplier is the first input end of the LM-FOT control circuit. A first output end of the multiplier is connected with an anti-phase input end of the first comparator. The node connecting the multiplier and the first comparator is configured for inputting a first reference voltage. A second output end of the multiplier is connected with a second signal port of the LM-FOT modulator.

A homo-phase input end of the first comparator is the second input end of the LM-FOT control circuit. An output end of the first comparator is respectively connected with a fourth signal port of the LM-FOT modulator and a second signal port of the trigger. A first signal port of the LM-FOT modulator is connected with an end of the first capacitance. Another end of the first capacitance is grounded. A third signal port of the LM-FOT modulator is connected with a first signal port of the trigger. An output end of the trigger is connected with an end of the trigger. Another end of the driver is the controlling end of the LM-FOT control circuit.

Preferably, the LM-FOT control circuit further includes a second comparator. An anti-phase input end of the second comparator is configured for inputting a second reference voltage. A homo-phase input end of the second comparator is connected with the homo-phase input end of the first comparator. An output end of the second comparator is connected with a fifth signal port of the LM-FOT modulator.

Preferably, the LM-FOT control circuit further includes a third comparator. A homo-phase input end of the third comparator is configured for inputting a third reference voltage. An anti-phase input end of the third comparator is a feedback end of the LM-FOT control circuit. An output end of the third comparator is connected with a second input end of the multiplier.

Furthermore, in order to reach the above aim, the present invention provides an electronic device that includes an adapter, a liquid display screen, a projector or a medical device, further includes the aforementioned flyback switching power supply.

The present invention provides the constant voltage output circuit exclusive of the high voltage electrolytic capacitor, improving the power of the power supply and reducing the electricity. Furthermore, due to the LM-FOT control circuit controls the turn on/off status of the switching circuit via a fixed-off of the switching circuit method, enabling the entire constant voltage to output circuit outputting constant voltage signals. When the work frequency of the constant voltage output circuit or duty ratio of the output voltage is changed, the outputting state of the constant voltage output circuit is not influenced. Therefore, the constant voltage output circuit of the present invention has an advantage of outputting stable voltage.

There and other features, aspects, and advantages of disclosure will be apparent to those skilled in the art from the following detailed description of embodiments, taken together with the drawings and the claims that follow.

DETAILED DESCRIPTION OF PREFERRED EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that those skilled in the art obtain based on embodiments of the present invention also all within the protection scope of the present invention.

Figure 1:
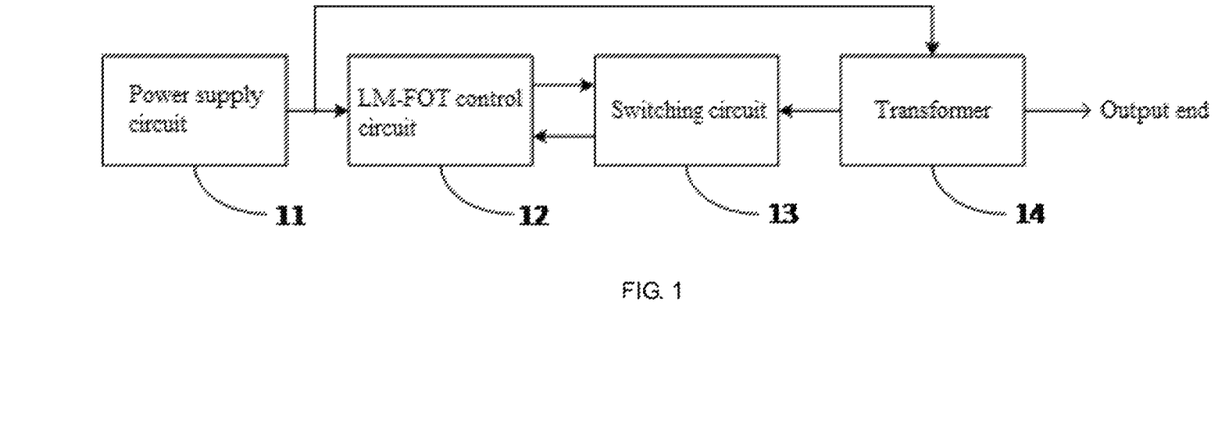
FIG. 1 is a block diagram of the constant voltage output circuit according to Embodiment 1 of the present invention.

As shown in FIG. 1, the present invention provides a constant voltage output circuit that includes: a power supply circuit 11, a Line-modulated Fixed-Off-Time control circuit 12, abbreviation for a LM-FOT control circuit 12, a switching circuit 13 and a transformer 14.

Output ends of the power supply circuit 11 are respectively connected with a first input end of the LM-FOT control circuit 12 and an end of a primary winding of the transformer 14. A controlling end of the LM-FOT control circuit 12 is connected with a controlled end of the switching circuit 13. A second input end of the LM-FOT control circuit 12 is connected with an output end of the switching circuit 13. An input end of the switching circuit 13 is connected with another end of the primary winding of the transformer 14. An end of a secondary line winding of the transformer 14 is configured as an output end of the constant voltage output circuit, another end of the secondary line winding of the transformer 14 is grounded.

The LM-FOT control circuit is configured for controlling a fixed-off time of the switching circuit based on voltage signals outputted by the power supply circuit, to realize the entire constant voltage output circuit outputting constant voltage signals.

Specifically, when the constant voltage output circuit starting, the power supply circuit 11 outputs the first voltage signal to the first input end of the LM-FOT control circuit 12, then the LM-FOT control circuit 12 starting, the controlling end of the LM-FOT control circuit 12 outputs the second voltage signal to the controlled end of the switching circuit, therefore, the switching circuit 13 is started. Meanwhile, an end of the primary winding of the transformer 14 receives the first voltage signal outputted by the power supply circuit 11. Due to another end of the primary winding of the transformer 14 connecting with the input end of the switching circuit 13, when the switching circuit 13 starting, the switching circuit 13 and the primary winding of the transformer 14 may form an oscillation circuit to enable the current in the switching circuit 13 to gradually increase. When the current in the switching circuit 13 is increasing to a certain extent, the outputting end of the switching circuit 13 outputs a third voltage signal to the second input end of the LM-FOT control circuit 12. The LM-FOT control circuit 12 controls turn-on/off state of the switching circuit 13, and records the off time of the switching circuit 13 based on the third voltage signal outputted by the output end of the switching circuit 13. When the off time of the switch circuit 13 reaches a preset value, the LM-FOT control circuit 12 control the switching circuit 13 to turn off again, which may make the switching circuit 13 turning on/off repetitively.

The present invention discloses the constant voltage output circuit without high voltage electrolytic capacitor, improving the power of the power supply and saving the electricity. Furthermore, due to the LM-FOT control circuit 12 using the method of fixing-on/off time to control the turn-on/off state of the switching circuit 13, so as to enable the function of enabling entire constant voltage circuit to output the constant voltage. When duty ratio of the input voltage of the constant voltage output circuit, or the working frequency thereof is changing, the output state of the constant outputting voltage circuit is not influenced. Therefore, the constant outputting voltage circuit disclosed by the present invention has an advantage of outputting stable voltages.

Figure 2:
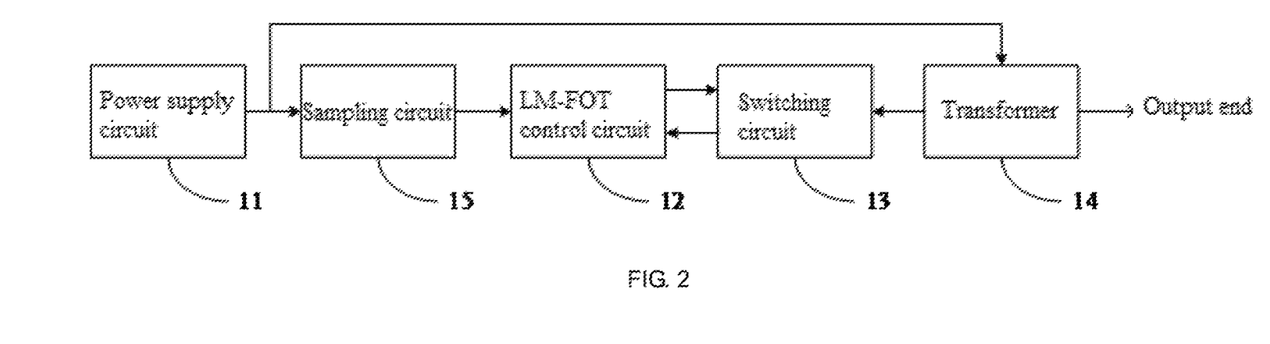
FIG. 2 is a block diagram of the constant voltage output circuit according to Embodiment 2 of the present invention.

Furthermore, as shown in FIG. 2, the constant voltage output circuit disclosed by the present invention includes a sampling circuit 15. A signal collecting end of the sampling circuit 15 is connected to the output end of the power supply circuit 11. A signal collecting output end of the sampling circuit 15 is connected with the first input end of the LM-FOT control circuit 12.

When the input voltage of the constant voltage output circuit is too large, electric elements in the constant voltage output circuit may be damaged. Therefore, the sampling circuit 15 added into the constant voltage output circuit may divide the voltage that is inputted into the constant voltage output circuit, thus reducing the voltage that is inputted into the LM-FOT control circuit 12. The possibility for damaging the electric elements in the constant voltage output circuit is reduced.

Figure 3:
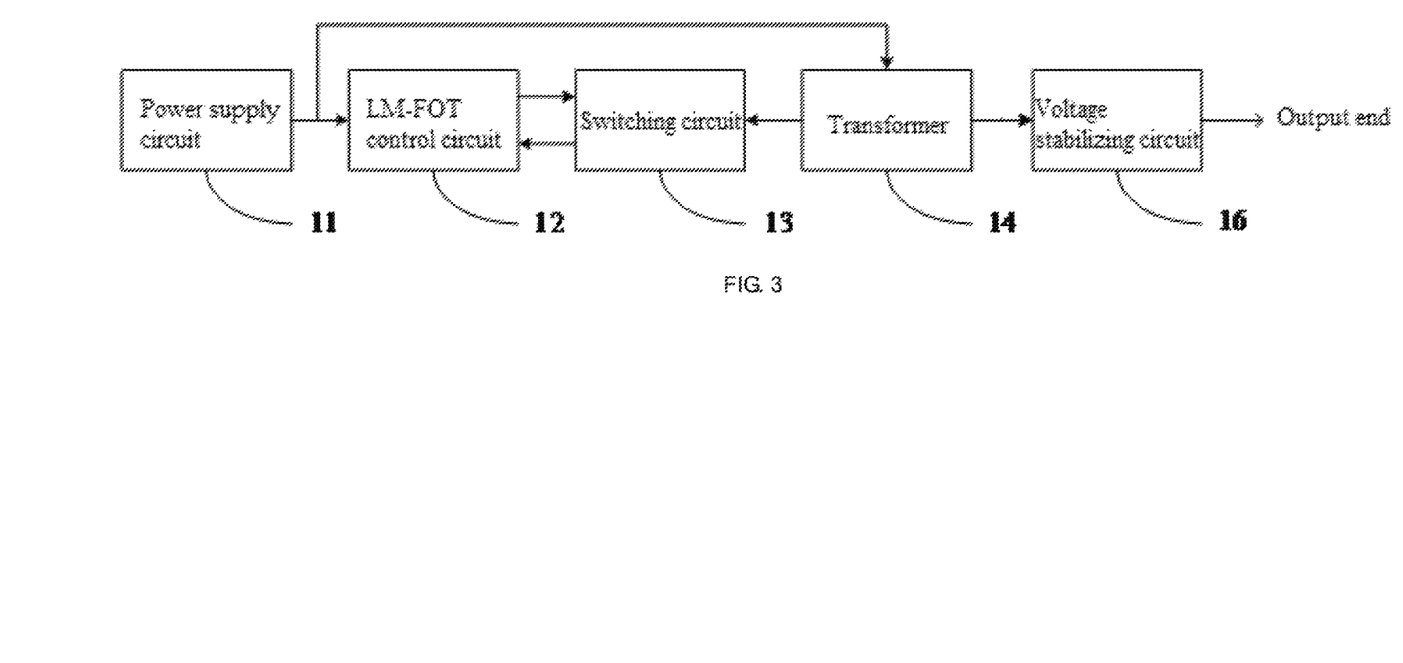
FIG. 3 is a block diagram of the constant voltage output circuit according to Embodiment 3 of the present invention.

Furthermore, as shown in FIG. 3, the constant voltage output circuit disclosed by the present invention includes a voltage stabilizing circuit 16. An input end of the voltage stabilizing circuit 16 is connected with an end of the secondary line winding of the transformer 14, another end of the voltage stabilizing circuit 16 is configured as an output end of the constant voltage output circuit. The present invention provides the constant voltage output circuit exclusive of the high voltage electrolytic capacitor, the end of the secondary line winding of the transformer 14 outputs constant voltage signals with bigger voltage ripple. Therefore, it needs to add the voltage stabilizing circuit 16 into the constant voltage output circuit to reduce voltage ripple that is outputted by the output end of the constant voltage output circuit, which makes the constant voltage signals more stable.

Figure 4:
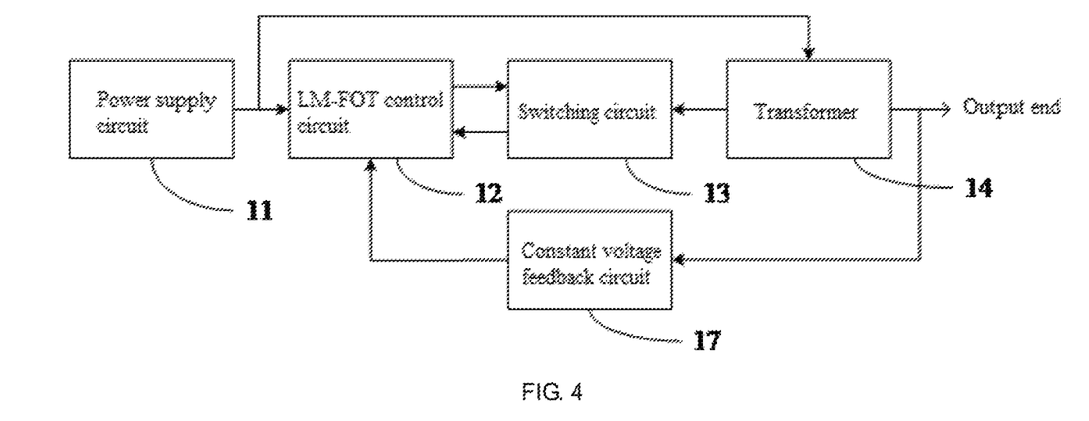
FIG. 4 is a block diagram of the constant voltage output circuit according to Embodiment 4 of the present invention.

Furthermore, as shown in FIG. 4, the present invention discloses the constant voltage output circuit including a constant voltage feedback circuit 17. An input end of the constant voltage feedback circuit 17 is connected with the output end of the constant voltage output circuit. An output end of the constant voltage feedback circuit 17 is connected with a feedback end of the LM-FOT control circuit 12.

When the constant voltage signals are outputted abnormally from the output end of the constant voltage output circuit, the input end of the constant voltage feedback circuit 17 receives the abnormal constant voltage signals, then the constant voltage feedback circuit 17 outputs the abnormal constant voltage signals to the feedback end of the LM-FOT control circuit 12. According to signals received by the feedback end of the LM-FOT control circuit 12, the LM-FOT control circuit 12 controls the working state of the switching circuit 13, to enable the constant voltage output circuit to output normal constant voltage.

Figure 5:
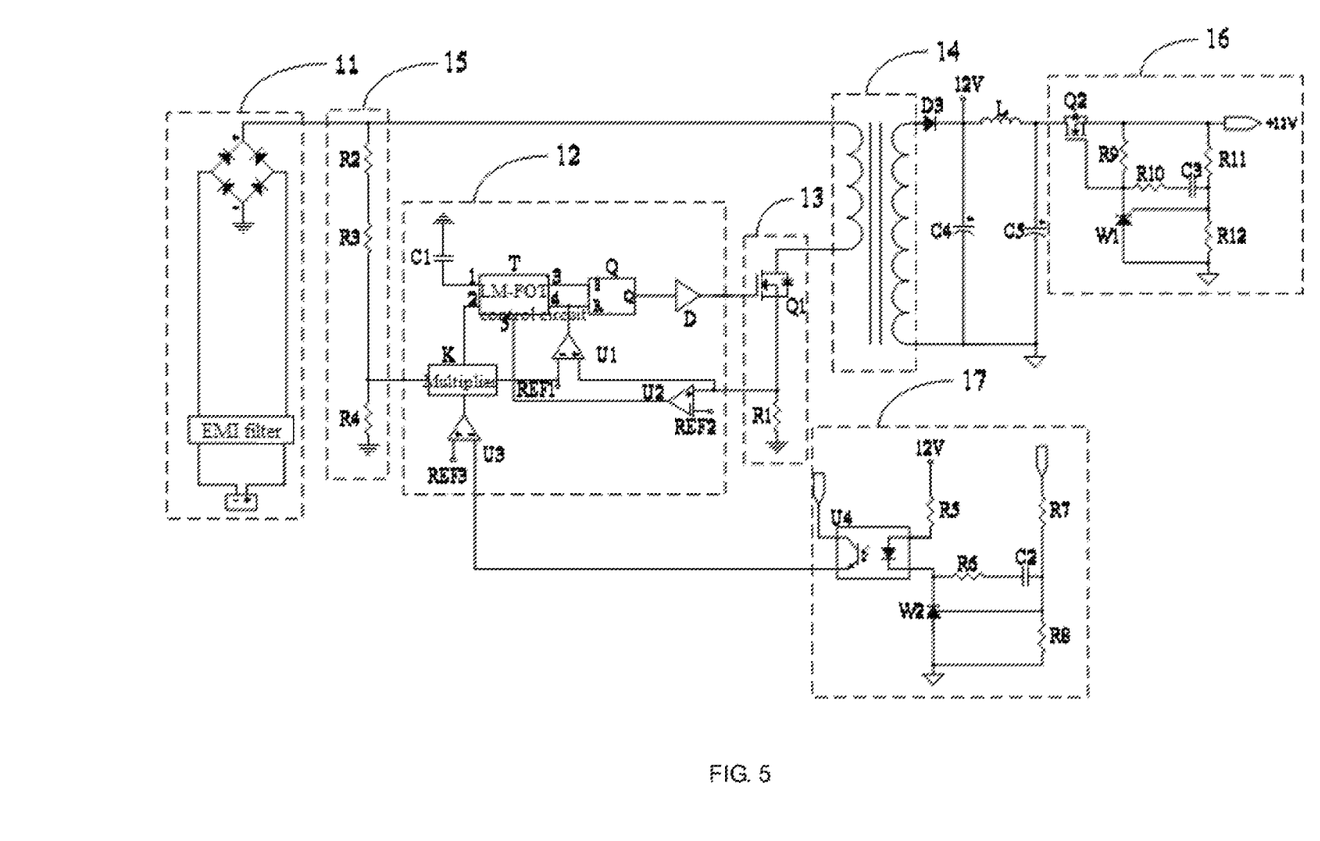
FIG. 5 is a structural diagram of principle of electric circuit of the constant voltage output circuit of the present invention.

Specifically, as shown in FIG. 5, FIG. 5 is a structural diagram of principle of electric circuit of the constant voltage output circuit of the present invention.

In which, the power supply circuit includes an AC power supply, an electromagnetic interface filter (EMI filter for short) and a rectifier bridge. The output end of the AC power supply is connected with the input end of the EMI filter. A first input end of the EMI filter is connected with a first end of the rectifier bridge. A second input end of the EMI filter is connected with a second end of the rectifier bridge. A negative output end of the rectifier bridge is grounded.

When the power supply circuit 11 starting, the AC power supply outputs alternating current with a certain peek value. Preferably, the AC voltage signal is sine wave signal, the peek value is 110V or 220V. The input end of the EMI filter receives the AC voltage signal from alternating current. The EMI filter filters clutter in the AC voltage signal outputted from the power supply. The output end of the EMI filter outputs the AC voltage signal after being filtered, to the rectifier bridge. The rectifier bridge rectifies the AC voltage signal, then outputs the voltage signal where the outputted waveform is like negative half-cycle signal in the AC voltage signal flipping over to the positive half-cycle, but the positive half-cycle signal still remains in the same place.

The LM-FOT control circuit 12 includes a multiplier K, a LM-FOT modulator T, a trigger Q, a driver D, a first comparator U1 and a first capacitance C1. In the embodiment, the trigger Q may be a RS trigger.

A first input end of the multiplier K is the first input end of the LM-FOT control circuit 12. A first output end of the multiplier K is connected with an anti-phase input end of the first comparator U1. The node connecting the multiplier K and the first comparator U1 is configured for inputting a first reference voltage REF1. The homo-phase input end of the first comparator U1 is the second input end of the LM-FOT control circuit 12. A second output end of the multiplier K is connected with a second signal port of the LM-FOT modulator T. A first signal port of the LM-FOT modulator T is connected with an end of the first capacitance C1, another end of the first capacitance C1 is grounded.

A third signal port of the LM-FOT modulator T is connected with S port of the RS trigger Q. A fourth signal port of the LM-FOT modulator T is respectively connected with R port of the RS trigger Q. The output end of the first capacitance U1 is grounded. The output end of the RS trigger Q is connected with an end of the driver D, the other end of the driver D is the controlling end of the LM-FOT control circuit 12.

When the LM-FOT control circuit 12 starts, the first input end of the multiplier K receives the voltage signals from the power supply circuit 11. The multiplier K amplifies the voltage signals that are received by the first input end of the multiplier K, then the second output end of the multiplier K outputs the amplified voltage signals to the second signal port of the LM-FOT modulator T. The LM-FOT modulator T controls the output port of the RS trigger Q to output high electrical level to conduct the switching circuit 13 turning on, according to the second signal port of the LM-FOT modulator T. Meanwhile, the first capacitance C1 starts to charge, when the first capacitance C1 is filled up with electricity, the voltage at the homo-phase input end of the first capacitance U1 is higher than the voltage at the first reference voltage REF1. The output end of the first capacitance U1 outputs high electrical level signals, then the R end of the RS trigger Q is triggered, and the output end of the RS trigger Q outputs low electrical level signals to control the switching circuit 13 to turn off. Meanwhile, the first capacitance C1 starts to discharge, when the voltages at two ends of the first capacitance C1 is zero, the LM-FOT modulator T conducts the switching circuit 13 turning on, repeating the above steps. Due to the first capacitance C1 is fixed, the charging time and discharging time are also fixed, the LM-FOT control circuit 12 is configured for controlling the turn-on/off state of the switching circuit 13 based on the fixed-on/off time of the switching circuit.

Furthermore, the LM-FOT control circuit 12 includes a second capacitance U2. An anti-phase input end of the second comparator U2 is configured for inputting a second reference voltage REF2. A homo-phase input end of the second comparator U2 is connected with the homo-phase input end of the first comparator U1. An output end of the second comparator U2 is connected with a fifth signal port of the LM-FOT modulator T.

When the voltage received by the homo-phase input end of the second comparator U2 is higher than the second reference voltage REF2. An output end of the second comparator U2 outputs a high electrical level signal to the fifth signal port of the LM-FOT modulator T. The LM-FOT modulator T controls the output end of the RS trigger Q to output a low electrical level signal, so as to turn off the switching circuit 13. According to the operation principle of the second comparator U2, the second comparator U2 may prevent the high voltage to burn the electronic parts and components in the circuit, the second comparator U2 has the function of protecting the circuit.

The LM-FOT control circuit 12 further includes a third comparator U3. A homo-phase input end of the third comparator U3 is configured for inputting a third reference voltage REF3. An input end of the third comparator U3 is a feedback end of the LM-FOT control circuit 12. An output end of the third comparator U3 is connected with a second input end of the multiplier K.

When the voltage inputted by the homo-phase input end of the third comparator U3 is higher than the third reference voltage REF3, the output end of the third comparator U3 outputs a high electrical level signal to the second input end of the multiplier K. The multiplier K amplifies the high electrical level signals that is received by the second input end of the multiplier K, then the second output end of the multiplier K outputs the amplified high electrical level signals to the second signal port of the LM-FOT modulator T. The LM-FOT modulator T may increase the off time of the switching circuit 13 based on the high electrical level signals received by the second signal port of the LM-FOT modulator T.

In the same way, when the voltage inputted by the homo-phase input end of the third comparator U3 is lower than the third reference voltage REF3. The LM-FOT modulator T may decrease the off time of the switching circuit 13 based on the low electrical level signals received by the second signal port of the LM-FOT modulator T. According to the operation principle of the third comparator U3, the third comparator U3 may assist the LM-FOT control circuit 12 to control the turn-on/off of the switching circuit 13.

The switching circuit 13 includes a first enhanced NMOS tube Q1 and a first resistance R1. A drain of the first enhanced NMOS tube Q1 is the input end of the switching circuit 13. A grid of the first enhanced NMOS tube Q1 is a controlled end of the switching circuit 13. A source of the first enhanced NMOS tube Q1 is connected with an end of the first resistance R1. Another end of the first resistance R1 is grounded.

When the switching circuit 13 starts, the grid of the first enhanced NMOS tube Q1 receives a high electrical level signal, conducting the first enhanced NMOS tube Q1. An oscillation circuit may be formed by the first enhanced NMOS tube Q1 and the transformer 14. Later, the current in the first resistance R1 is gradually increasing, the voltage outputted from the node of connecting the first enhanced NMOS tube Q1 and the first resistance R1 is increasing correspondingly. When the increasing voltage reaches or more than the first reference voltage REF1, the LM-FOT control circuit 12 conducts the switching circuit 13 turning off. After the fixing-off time, the LM-FOT control circuit 12 conducts the switching circuit 13 turning on. According to the operation principle of the switching circuit 13, the oscillation circuit may be formed by the switching circuit 13 and the transformer 14, to realize that the secondary line winding of the transformer 14 outputs constant voltage signals.

The voltage stabilizing circuit 16 includes a tenth resistance R10, a eleventh resistance R11, a twelfth resistance R12, a second enhanced NMOS tube Q2, a third capacitance C3, a first controllable regulated power supply W1. In the embodiment, the controllable stabilized power supply W1 may be TL431.

A drain of the second enhanced NMOS tube Q2 is the input end of the voltage stabilizing circuit 16. A source of the second enhanced NMOS tube Q2 are respectively connected with a ninth resistance R9, an end of the eleventh resistance R11. The node for connecting the second enhanced NMOS tube Q2, the ninth resistance R9, and the eleventh resistance R11 is configured as an output end of the voltage stabilizing circuit 16.

A grid of the second enhanced NMOS tube Q2 is respectively connected with another end of the ninth resistance R9, an end of the tenth resistance R10 and a negative end of the first controllable regulated power supply W1. Another end of the tenth resistance R10 is connected with another end of the third capacitance C3. Another end of the tenth resistance R10 is respectively connected with another end of the eleventh resistance R11, an end of the twelfth resistance R12 and a reference end of the first controllable regulated power supply W1. Another end of the twelfth resistance R12 is connected with a positive end of the first controllable regulated power supply W1. The node connecting the first controllable regulated power supply W1 and the twelfth resistance R12 is grounded.

When the voltage outputted by the output end of the voltage stabilizing circuit 16 is increasing, the current flowing through the eleventh resistance R11 and the twelfth resistance R12 is increasing correspondingly. Due to the current flowing through the drain and source of the second enhanced NMOS tube Q2 is constant, the current flowing through the ninth resistance R9 and the first controllable regulated power supply W1 decreases. Meanwhile, the voltage at the negative end of the first controllable regulated power supply W1 is decreasing, and the voltage-difference between the grid and source of the second enhanced NMOS tube Q2 is decreasing, the current flowing through the drain and source of the second enhanced NMOS tube Q2 is decreasing, the current flowing through the eleventh resistance R11 and the twelfth resistance R12 is decreasing, the voltage outputted by the output end of the voltage stabilizing circuit 16 is decreasing.

In the same way, when the voltage outputted by the voltage stabilizing circuit 16 is decreasing, the current flowing through the ninth resistance R9 and the first controllable regulated power supply W1 is increasing, and voltage at the negative end of the first controllable regulated power supply W1 is increasing, the voltage-difference between the grid and source of the second enhanced NMOS tube Q2 is increasing, the current flowing through the drain and source of the second enhanced NMOS tube Q2 is increasing, the current flowing through the eleventh resistance R11 and the twelfth resistance R12 is increasing, the voltage outputted by the output end of the voltage stabilizing circuit 16 is increasing.

According to the operation principle of the voltage stabilizing circuit 16, when the voltage outputted by the output end of the constant voltage output circuit is changing, the voltage stabilizing circuit 16 may adjust the voltage outputted by the output end of the constant voltage output circuit, to ensure stabilization of the output voltage from the output end of the constant voltage output circuit.

Moreover, among the transformer 14 and voltage stabilizing circuit 16 have a third diode D3, an inductance L, a fourth capacitance C4 and a fifth capacitance C5. The anode of the third diode D3 is connected with the secondary line winding of the transformer 14. The cathode of the third diode D3 is respectively connected with an end of the inductance L and positive electrode of the fourth capacitance C4. Another end of the inductance L is connected with positive electrode of the fifth capacitance C5. The node for connecting the inductance L and the fifth capacitance C5 is connected to the input end of the voltage stabilizing circuit 16. Negative electrode of the fourth capacitance C4 is respectively connected with another end of the secondary line winding of the transformer 14 and negative electrode of the fifth capacitance C5. The node for connecting the fourth capacitance C4 and the fifth capacitance C5 is grounded.

When the end of the secondary line winding of the transformer 14 outputs constant voltage signals, the third diode D3 filters the clutter signals of less amplitude in the constant voltage signals. A band-pass filter is formed of the fourth capacitance C4 and the fifth capacitance C5, which may filter the clutter signals of a high frequency and a low frequency. In addition, adding the inductance L in the constant voltage output circuit makes the output signals more gently.

The constant voltage feedback circuit 17 includes a fifth resistance R5, a sixth resistance R6, a seventh resistance R7, a second capacitance C2, an optical coupler U4, a second controllable regulated power supply W2. In the embodiment, the second controllable regulated power supply W2 is TL421. The fourth signal end of the optical coupler U4 is connected with the power supply. The third signal end of the optical coupler U4 works as the output end of the constant voltage feedback circuit 17. The first signal end of the optical coupler U4 is connected with an end of the fifth resistance R5. Another end of the fifth resistance R5 is grounded. The second signal end of the optical coupler U4 is respectively connected with an end of the sixth resistance R6 and the negative end of the second controllable regulated power supply W2. Another end of the sixth resistance R6 is connected with the end of the second resistance R2. Another end of the second resistance R2 is respectively connected with an end of the seventh resistance R7, a reference end of the second controllable regulated power supply W2 and an end of the eighth resistance R8. Another end of the seventh resistance R7 is connected with the node of connecting the inductance L and the fifth capacitance C5. Another end of the resistance R8 is grounded, as well as the positive end of the second controllable regulated power supply W2 is grounded.

The seventh resistance R7 and the eighth resistance R8 are configured for collecting the constant voltage signals outputted from an end of the inductance L. The constant voltage feedback circuit 17 collects the constant voltage signals outputted from the end of the inductance L, then the constant voltage may be transmitted by the optical coupler U4 to the LM-FOT control circuit 12, so that the LM-FOT control circuit 12 adjusts the turn on/off state of the switching circuit 13 based on the constant voltage signal collected by the constant voltage feedback circuit 17.

The working process of the constant voltage output circuit of the present invention is described hereinafter.

When the constant voltage output circuit starts, the AC power supply outputs a sine wave signal. The EMI filter filters the sine wave signal outputted by the AC power supply then transfers the sine wave signal to the rectifier bridge. Then the rectifier bridge rectifies the filtered sine wave signal, and outputs the first voltage signal. The first input end of the multiplier K in the LM-FOT control circuit 12 receives the first voltage signal. The LM-FOT control circuit 12 starts, another end of the driver D in the LM-FOT control circuit 12 outputs the second voltage signal. The grid of the first enhanced NMOS tube Q1 in the switching circuit 13 receives the second voltage signal, then the switching circuit 13 starts.

Meanwhile, the end of the primary line winding of the transformer 14 receives the first voltage signal that is outputted by the output end of the rectifier bridge. Since another end of the primary line winding of the transformer 14 is connected with the drain of the first enhanced NMOS tube Q1 in the switching circuit 13. Therefore, when the switching circuit 13 starts, the oscillation circuit may be formed by the first enhanced NMOS tube Q1 and the primary line winding of the transformer 14. The oscillation circuit may gradually increase the current flowing through the first resistance R1 in the switching circuit 13, and the current flowing through the drain and source of the first enhanced NMOS tube Q1. Accordingly, the sampling voltage of the first resistance R1 in the switching circuit 13 is gradually increasing. The node of connecting the first resistance R1 in the switching circuit 13 and the first enhanced NMOS tube Q1 outputs the third voltage signal to the homo-phase end of the first comparator U1 in the LM-FOT control circuit 12. When the current flowing through the first resistance R1 is gradually increasing to a certain extent, the node of connecting the first resistance R1 and the first enhanced NMOS tube Q1 outputs the third voltage signal that is bigger than the first reference voltage REF1. The R end of the RS trigger Q outputs high electrical level, and the output end of the RS trigger Q outputs low electrical level to conduct the switching circuit 13 turning off.

At this point, the fourth signal port of the LM-FOT modulator T receives the high electrical level signals outputted by the output end of the first comparator U1. When the LM-FOT modulator T records the time when receiving the high electrical level signals outputted by the output end of the first comparator U1, and starts to charge the first capacitance C1, then the voltage between two ends of the first capacitance C1 increases. Furthermore, the sampling circuit 15 transfers the sampling signals of the first voltage signals outputted by the power supply circuit 11, to the multiplier K in the LM-FOT control circuit 12. The sampling signals of the first voltage signals are amplified by the multiplier K then being transferred to the first input end of the LM-FOT modulator T. When the voltage between the first capacitance C1 is increasing to equate the voltage received by the second signal end of the LM-FOT modulator T. The third signal end of the LM-FOT modulator T outputs signals to the S end of the RS trigger Q. The output end of the RS trigger Q outputs high electrical level signals to conduct the switching circuit 13 turning on. Based on the above principle, to repeat the turn-on/off process of the switching circuit 13 realizes the aim of entire constant voltage output circuit outputting constant voltage.

Furthermore, when the output load overloads, the current flowing through the first resistance R1 in the switching circuit 13 is increasing, the voltage between tow ends of the first resistance R1 is increasing accordingly. When the voltage between the first resistance R1 is more than the second reference voltage REF2 of the second comparator U2 in the LM-FOT control circuit 12, the output end of the second comparator U2 outputs the high electrical level to trigger the LM-FOT modulator T stopping work. Therefore, to add the second comparator U2 in the LM-FOT control circuit 12 may realize overload protection of the LM-FOT control circuit 12.

Further, when the voltage outputted by the output end of the constant voltage output circuit is decreasing, the input end of the constant voltage feedback circuit 17 receives the decreased voltage. The decreased voltage is amplified then being transferred by the constant voltage feedback circuit 17, to the anti-phased input end of the third comparator U3 in the LM-FOT control circuit 12. At this moment, the output end of the third comparator U3 in the LM-FOT control circuit 12 outputs the high electrical level, then the high electrical level signals are amplified by the multiplier K then being transferred to the second input end of the LM-FOT modulator T. The LM-FOT modulator T may increase the duty ratio of the turn-on time of the first enhanced NMOS tube Q1 based on error signals received by the second input end of the LM-FOT modulator T. Due to the turn-on time of the first enhanced NMOS tube Q1 is prolonged, the voltage outputted by the output end of the constant voltage output circuit is enlarged accordingly.

As well, when the voltage outputted by the constant voltage output circuit is enlarged, the LM-FOT control circuit 12 controls the turn-on time of the first enhanced NMOS tube Q1 decreasing based on the feedback signals of the constant voltage feedback circuit 17. So, adding the third comparator U3 to the LM-FOT control circuit 12 and adding the constant voltage feedback circuit 17 to the constant voltage output circuit may enable voltage signals from the output end of the constant voltage output circuit to be more stable.

Furthermore, since the LM-FOT control method of the present invention is realizing the constant voltage output circuit to output constant voltage. But in the LM-FOT control method, the frequency of the switching power supply is adjustable, controlling the peek current at the fixed-off time of the constant voltage output circuit. When the duty ratio of the input voltage of the constant voltage output circuit is different, under the circumstances the inductance current L from the output end of the constant voltage output circuit remains stable. The present invention can fix the off time of the constant voltage output circuit by the first capacitance C1 in the LM-FOT control circuit 12. Therefore, when the capacitance value of the first capacitance C1 in the LM-FOT control circuit 12 is predetermined, the range of voltage inputted to the constant voltage output circuit is set accordingly.

Due to relatively large range in the commercial voltage, voltage may be 110V, 220V and so on. If the work frequency of the constant voltage output circuit is among 60-80 KHZ, the predetermined fixed-off time is invariant, in the low voltage area, the power supply in the constant voltage output circuit works normally, whereas in the high voltage area, the current flowing through the constant voltage output circuit may sharply increase which may damage the electronic elements. In such case, technology for adjusting the voltage of the input wire is adopted, by detecting the voltage of the LM-FOT control circuit 12, the fixed-on time is determined, that is the Line-modulated (LM for short) technology. Given all this, the constant voltage output circuit of the present invention adds a sampling circuit 15 that makes the LM-FOT control circuit 12 to control the fixed-off time of the switching circuit 13 based on AC input voltage and the sampling signal of the sampling circuit 15.

The sampling circuit 15 is configured for sampling the rectified AC commercial voltage. When the commercial voltage is increasing, the node of connecting the third resistance R3 and fourth resistance R4 outputs the high electric signal. The high electric signals are amplified by the multiplier K in the LM-FOT control circuit 12 then being transferred to the first signal port of the LM-FOT modulator T. The multiplier K prolongs the turn-off time of the first enhanced NMOS tube Q1 based on the high electric signals received by the first signal port of the multiplier K, and shortens the turn-on time of the first enhanced NMOS tube Q1. Therefore, when the entire constant voltage output circuit inputs too much voltage, the current distortion may became smaller, so as to improve the reliability of the constant voltage output circuit.

In order to better interpret the principle of the present invention, the present invention discloses another embodiment of the constant voltage output circuit.

Figure 6:
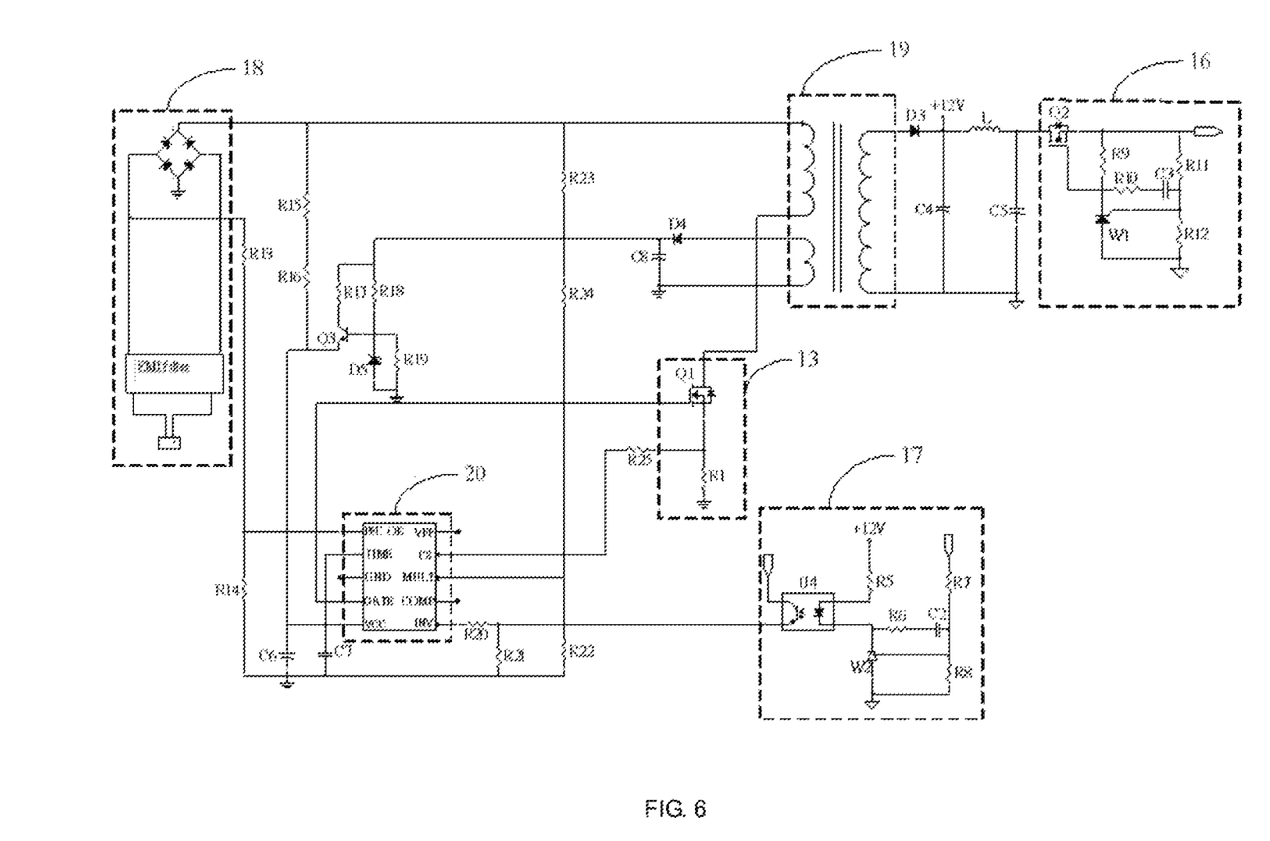
FIG. 6 is a structural diagram of specific implemented circuit of the constant voltage output circuit of the present invention.

As shown in FIG. 6, FIG. 6 is a structural diagram of specific implemented circuit of the constant voltage output circuit of the present invention. The constant voltage output circuit includes the aforementioned switching circuit 13, the constant voltage feedback circuit 17, the voltage stabilizing circuit 16, the power supply circuit 18, the transformer 19, the LM-FOT control chip 20, the thirteenth resistance R13, the fourteenth resistance R14, the fifteenth resistance R15, the sixteenth resistance R16, the seventeenth resistance R17, the eighteenth resistance R18, the nineteenth resistance R19, the twentieth resistance R20, the twenty-first resistance R21, the twenty-second resistance R22, the twenty-third resistance R23, the twenty-fourth resistance R24, the twenty-fifth resistance R25, the sixth capacitance C6, the seventh capacitance C7, the eighth capacitance C8, the fourth diode D4, the fifth zener diode D5 and the third NPN triode Q3. In which, the type of the LM-FOT control chip 20 is L4984.

The first output end of the power supply circuit 18 is respectively connected with an end of the fifteenth resistance R15, an end of the twenty-third resistance R23 and an end of the primary line winding of the transformer 14. The second output end of the power supply circuit 18 is connected with an end of the thirteenth resistance R13. Another end of the fifteenth resistance R15 is connected with an end of the sixteenth resistance R16. Another end of the sixteenth resistance R16 is respectively connected with an emitter of the third NPN third diode Q3, the positive electrode of the sixth capacitance C6 is grounded and the VCC pin end of the LM-FOT control chip 20 is grounded. Another end of the thirteenth resistance R13 is respectively connected with the PFC-OK pin end of the LM-FOT control chip 20 and the end of the fourteenth resistance R14. Another end of the fourteenth resistance R14 is grounded, another end of the sixth capacitance C6 is grounded.

A collector of the third NPN triode Q3 is connected with the end of the seventeenth resistance R17. The base of the third NPN triode Q3 is connected the end of the seventeenth resistance R17. The base of the third NPN triode Q3 is respectively connected with the end of the nineteenth resistance R19, the cathode of the fifth zener diode D5. Another end of the nineteenth resistance R19 is grounded and the anode of the fifth zener diode D5 is grounded. The node of connecting the seventeenth resistance R17 and the eighteenth resistance R18 is respectively connected the cathode of the fourth diode D4 and the positive electrode of the eighth capacitance C8. The cathode of the eighth capacitance C8 is grounded. The anode of fourth diode D2 is connected with an end of the second primary wind of the transformer 19. Another end of the second primary wind of the transformer 19 is grounded. Another end of the twenty-third resistance R23 is connected with an end of the twenty-fourth resistance R24, another end of the twenty-fourth resistance R24 is respectively connected with an end of the twenty-second resistance R22. And the MULT pin end is grounded.

The GATE pin end of the LM-FOT control chip 20 is grounded and the controlled end of the switching circuit 13 is grounded. The TIME pin end of the LM-FOT control chip 20 is connected with an end of the seventh capacitance C7. Another end of the seventh capacitance C7 is grounded. The INV pin end of the LM-FOT control chip 20 is connected with the end of the twentieth resistance R20. Another end of the twentieth resistance R20 is respectively connected with the end of the twenty-first resistance R21 and the output end of the constant voltage feedback circuit 17, another end of the twenty-first resistance R21 is grounded. The CS pin end of the twentieth resistance R20 is connected with an end of the twenty-fifth resistance R25.

Another end of the twenty-fifth resistance R25 is connected with the output end of the switching circuit 13. The input end of the switching circuit 13 is connected with another end of the primary line winding of the transformer 19. The end of the secondary line winding of the transformer 19 is connected with the anode of the third diode D3. The cathode of the third diode D3 is respectively connected with an end of the inductance L and the positive electrode of the fourth capacitance C4. Another end of the inductance L is respectively connected with the positive electrode of the fifth capacitance C5 and the input end of the voltage stabilizing circuit 16. Another end of the secondary line winding of the transformer 19, the negative electrode of the fourth capacitance C4 and the negative electrode of the fifth capacitance C5 are grounded.

In particular, when the constant voltage output circuit starts, the first output end of the power supply circuit 18 outputs the first voltage signal to an end of the first primary line winding of the transformer 19. Meanwhile, the fifteenth resistance R15, the sixteenth resistance R16 and the sixth capacitance C6 may form the pre-start circuit of the LM-FOT control chip 20. The fifteenth resistance R15 and the sixteenth resistance R16 may charge for the sixth capacitance C6. When the voltage of the sixth capacitance C6 is increasing, the LM-FOT control chip 20 starts to work, controlling the first enhanced NMOS tube Q1 to open. Then the second primary line winding of the transformer 19 outputs the VCC voltage to the fourth diode D4 and the eighth capacitance C8.

The eighteenth resistance R18 and the nineteenth resistance R19 controls the base voltage of the third NPN triode Q3 based on the charging voltage of the eighth capacitance C8, enabling the collector of the third NPN triode Q3 to output constant voltage. The seventh resistance R17 works as a current limiting resistance. The fifth zener diode D5 works as a protecting zener diode D5 of the third NPN triode Q3. When the voltage at the VCC pin end of the LM-FOT control chip 20 is stable, the LM-FOT control chip 20 works normally. The LM-FOT control chip 20 controls the transformer 19 to oscillate, enabling the second primary line winding of the transformer 19 to output VCC to provide stable working voltage to the LM-FOT control chip 20. The transformer 19 outputs constant voltage 12V under the control of the LM-FOT control chip 20. The secondary line winding of the transformer 19 outputs the constant voltage. Then the constant voltage is filtered by the voltage stabilizing circuit 16, then being outputted to provide power to external electronic devices, such as the televisions.

Furthermore, the thirteenth resistance R13 and the fourteenth resistance R14 may form a bleeder and sample circuit.

The node of connecting the thirteenth resistance R13 and the fourteenth resistance R14 outputs the sampled voltage to the PFC-OK pin end of the LM-FOT control chip 20, working as the input under-voltage detecting function of the constant voltage output circuit, like setting an input under-voltage protection. For instance, when the commercial voltage is less than 65V, the LM-FOT control chip 20 stops working; when the commercial voltage returns to 85V, the LM-FOT control chip 20 starts working; when the commercial voltage is more than 310 v, the LM-FOT control chip 20 stops working.

The TIME pin end of the LM-FOT control chip 20 is connected with an end of the seventh capacitance C7, which is configured for setting the fixing turn on/off time. The fixing turn on/off time may be realized by following procedures: when the first enhanced NMOS tube Q1 opens, the sampled voltage of the first resistance R1 is gradually increasing, when the sampled voltage of the resistance R1 is more than the reference voltage inside the CS pin end of the LM-FOT control chip 20, the GATE pin end of the LM-FOT control chip 20 outputs the controlling signal to control the switching circuit 13, to cause the turn-off of the first enhanced NMOS tube Q1. Meanwhile, the LM-FOT control chip 20 records the moments when the first enhanced NMOS tube Q1 turns off. One hand, the LM-FOT control chip 20 starts charging the seventh capacitance C7, to gradually increase the voltage between two ends of the seventh capacitance C7. On the other hand, the MULT pin end of the LM-FOT control chip 20 receives the first voltage signals outputted by the first output end of the power supply via the twenty-second resistance R22. When the voltage between two ends of the seventh capacitance C7 is increasing to the voltage between two ends of the twenty-second resistance R22. The fixing off time is closed and the GATE pin end of the LM-FOT control chip 20 flips to conduct the first enhanced NMOS tube Q1 turning on. Repeating the above turn-on/off process of the switching circuit 13 may enable the constant voltage circuit to output constant voltage.

According to the above mentioned embodiment, the input voltage of the constant voltage output circuit is in certain region, the turn on/off time is fixed. However, the commercial voltage deviation is large, such as 110V, 220V and so on. When the working frequency of the switching circuit is among 60-80 KHZ, the fixing turn on/off time is constant. In the low-voltage area, when the power supply works normally, but in the high-voltage area, the switch-on current may sharply increase which may damage the electronic elements. Therefore, by using the input voltage adjusting technology, that is, the fixing turn on time may be determined by input voltage. The realizing method of the input voltage adjusting technology is that the twenty-third resistance R23, the twenty-fourth resistance R24, the twenty-second resistance R22 form a line voltage sampling circuit, configured for sampling the rectified AC commercial voltage. When the commercial voltage increases, the line voltage sampling circuit samples the high electrical signal that is transferred to the MULT pin end of the LM-FOT control chip 20. The LM-FOT control chip 20 prolongs the turn off time of the first enhanced NMOS tube Q1 based on the sampled high electrical signals, and shortens the turn on time of the first enhanced NMOS tube Q1, enabling the constant voltage output circuit to reduce the sharp increasing when inputting the high voltage. Therefore, the reliability of the constant voltage output circuit is improved.

Furthermore, when the output load of the constant voltage output circuit overloads, the voltage between two ends of the first resistance R1 is increasing. When the voltage between two ends of the first resistance R1 is larger than the reference voltage inside the CS pin end of LM-FOT control chip 20, the LM-FOT control chip 20 stops working, the LM-FOT control chip 20 goes into the protection status, and the constant voltage output circuit stops working.

The constant voltage output circuit of the present invention omits the large electrolytic capacitor, avoiding the leading current in the circuit, thus enabling the in-phase power supply of the commercial power and the current. Comparing with the prior art, improving power of the power supply and saving the commercial actual electricity. Adapting the working method of fixing switching on/off time, the output status of the constant voltage output circuit is not influenced because of the working frequency of the constant voltage output circuit and the duty ratio of the input voltage, improving the stability of the output voltage of the constant voltage output circuit. To fix the switching-on/off time by the voltage modulation, the constant voltage output circuit may operate normally when the inputted commercial voltage is overhigh. The reliability of the constant voltage output circuit may be improved.

The present invention further provides a flyback switching power supply and an electronic device that includes an adapter, a liquid display screen, a projector or a medical device. The flyback switching power supply includes the above constant voltage output circuit that includes the aforementioned technical solutions in each embodiment of the present invention, detailed circuit structure may referred to FIG. 1 to FIG. 6, without further description herein. Since adapting the above power supply circuit, comparing with the prior art, the present invention has lower production cost and higher reliability.

The foregoing descriptions are merely embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

We claim:

1. A constant voltage output circuit comprising:
a power supply circuit;
a LM-FOT control circuit;
a switching circuit; and
a transformer;
wherein output ends of the power supply circuit are respectively connected with a first input end of the LM-FOT control circuit and an end of a primary winding of the transformer, a controlling end of the LM-FOT control circuit is connected with a controlled end of the switching circuit; a second input end of the LM-FOT control circuit is connected with an output end of the switching circuit; an input end of the switching circuit is connected with the other end of the primary winding of the transformer; an end of a secondary winding of the transformer is configured as an output end of the constant voltage output circuit, another end of the secondary winding of the transformer is grounded;
the LM-FOT control circuit is configured for controlling a fixed-off time of the switching circuit based on voltage signals outputted by the power supply circuit, to realize the entire constant voltage output circuit outputting constant voltage signals.

2. The constant voltage output circuit of claim 1, wherein further comprising a sampling circuit; a signal collecting end of the sampling circuit is connected to the output end of the power supply circuit; a signal collecting output end of the sampling circuit is connected with the first input end of the LM-FOT control circuit.

3. The constant voltage output circuit of claim 1, wherein further comprising a constant voltage feedback circuit, an input end of the constant voltage feedback circuit is connected with the output end of the constant voltage output circuit; an output end of the constant voltage feedback circuit is connected with a feedback end of the LM-FOT control circuit.

4. The constant voltage output circuit of claim 1, wherein further comprising a voltage stabilizing circuit; an end of the voltage stabilizing circuit is connected with an end of the secondary winding of the transformer, another end of the voltage stabilizing circuit is configured as an output end of the constant voltage output circuit.

5. The constant voltage output circuit of claim 1, wherein, the switching circuit comprising a first enhanced NMOS and a first resistance;
a drain of the first enhanced NMOS is the input end of the switching circuit; a gate of the first enhanced NMOS is a controlled end of the switching circuit; a source of the first enhanced NMOS is connected with an end of the first resistance; a node connecting the first enhanced NMOS and the first resistance is the output end of the switching circuit; another end of the first resistance is grounded.

6. The constant voltage output circuit of claim 1, wherein the LM-FOT control circuit comprising a multiplier, a LM-FOT modulator, a trigger, a driver, a first comparator and a first capacitance;
an input end of the multiplier is the first input end of the LM-FOT control circuit; a first output end of the multiplier is connected with an anti-phase input end of the first comparator; the node connecting the multiplier and the first comparator is configured for inputting a first reference voltage; a second output end of the multiplier is connected with a second signal port of the LM-FOT modulator;
a homo-phase input end of the first comparator is the second input end of the LM-FOT control circuit; an output end of the first comparator is respectively connected with a fourth signal port of the LM-FOT modulator and a second signal port of the trigger; a first signal port of the LM-FOT modulator is connected with an end of the first capacitance, another end of the first capacitance is grounded; a third signal port of the LM-FOT modulator is connected with a first signal port of the trigger, an output end of the trigger is connected with an end of the driver, another end of the driver is the controlling end of the LM-FOT control circuit.

7. The constant voltage output circuit of claim 6, wherein the LM-FOT control circuit further comprising a second comparator, an anti-phase input end of the second comparator is configured for inputting a second reference voltage; a homo-phase input end of the second comparator is connected with the homo-phase input end of the first comparator, an output end of the second comparator is connected with a fifth signal port of the LM-FOT modulator.

8. The constant voltage output circuit of claim 7, wherein, the LM-FOT control circuit further comprising a third comparator, a homo-phase input end of the third comparator is configured for inputting a third reference voltage; an anti-phase input end of the third comparator is a feedback end of the LM-FOT control circuit; an output end of the third comparator is connected with a second input end of the multiplier.

9. A flyback switching power supply comprising a constant voltage output circuit, wherein the constant voltage output circuit comprises a power supply circuit, a LM-FOT control circuit, a switching circuit and a transformer;
output ends of the power supply circuit are respectively connected with a first input end of the LM-FOT control circuit and an end of a primary winding of the transformer; a controlling end of the LM-FOT control circuit is connected with a controlled end of the switching circuit; a second input end of the LM-FOT control circuit is connected with an output end of the switching circuit; an input end of the switching circuit is connected with the other end of the primary winding of the transformer; one end of a secondary winding of the transformer is configured as an output end of the constant voltage output circuit, the other end of the secondary winding of the transformer is grounded;
the LM-FOT control circuit is configured for controlling a fixed-off time of the switching circuit based on voltage signals outputted by the power supply circuit, to realize the end of the secondary winding of the transformer outputting circuit outputting constant voltage signals.

10. The flyback switching power supply of claim 9, wherein the constant voltage output circuit further comprising a sampling circuit; a signal collecting end of the sampling circuit is connected to the output end of the power supply circuit; a signal collecting output end of the sampling circuit is connected with the first input end of the LM-FOT control circuit.

11. The flyback switching power supply of claim 9, wherein the constant voltage output circuit further comprising a constant voltage feedback circuit; an input end of the constant voltage feedback circuit is connected with the output end of the constant voltage output circuit; an output end of the constant voltage output circuit is connected with a feedback end of the LM-FOT control circuit.

12. The flyback switching power supply of claim 9, wherein the constant voltage output circuit further comprising a voltage stabilizing circuit; an end of the voltage stabilizing circuit is connected with an end of the secondary winding of the transformer, another end of the voltage stabilizing circuit is configured as an output end of the constant voltage output circuit.

13. The flyback switching power supply of claim 9, wherein the switching circuit comprising a first enhanced NMOS and a first resistance;
a drain of the first enhanced NMOS is the input end of the switching circuit; a gate of the first enhanced NMOS is a controlled end of the switching circuit; a source of the first enhanced NMOS is connected with an end of the first resistance; a node connecting the first enhanced NMOS and the first resistance is the output end of the switching circuit; another end of the first resistance is grounded.

14. The flyback switching power supply of claim 9, wherein the LM-FOT control circuit comprising a multiplier, a LM-FOT modulator, a trigger, a driver, a first comparator and a first capacitance;
a first input end of the multiplier is the first input end of the LM-FOT control circuit; a first output end of the multiplier is connected with an anti-phase input end of the first comparator; the node connecting the multiplier and the first comparator is configured for inputting a first reference voltage; a second output end of the multiplier is connected with a second signal port of the LM-FOT modulator;

a homo-phase input end of the first comparator is the second input end of the LM-FOT control circuit; an output end of the first comparator is respectively connected with a fourth signal port of the LM-FOT modulator and a second signal port of the trigger, a first signal port of the LM-FOT modulator is connected with an end of the first capacitance; another end of the first capacitance is grounded; a third signal port of the LM-FOT modulator is connected with a first signal port of the trigger, an output end of the trigger is connected with an end of the driver, the other end of the driver is the controlling end of the LM-FOT control circuit.

15. The flyback switching power supply of claim 14, wherein the LM-FOT control circuit further comprising a second comparator; an anti-phase input end of the second comparator is configured for inputting a second reference voltage; a homo-phase input end of the second comparator is connected with the homo-phase input end of the first comparator; an output end of the second comparator is connected with a fifth signal port of the LM-FOT modulator.

16. The flyback switching power supply of claim 15, wherein, the LM-FOT control circuit further comprising a third comparator; a homo-phase input end of the third comparator is configured for inputting a third reference voltage; an anti-phase input end of the third comparator is a feedback end of the LM-FOT control circuit; an output end of the third comparator is connected with a second input end of the multiplier.

17. An electronic device being an adapter, a liquid display screen, a projector or a medical device, further comprising a flyback switching power supply of claim 9.

* * * * *